Oct. 29, 1968 N. J. BAMBACE ET AL 3,408,559

LINE VOLTAGE STABILIZER HAVING PARALLEL DYNAMIC AND STABLE IMPEDANCE PATHS

Filed Aug. 10, 1966

INVENTOR.
NATALE J. BAMBACE
CHARLES R. KENNY
ADOLPH G. OESTERLE
BY
H. S. Mackey
ATTORNEY United States Patent Office 3,408,559
Patented Oct. 29, 1968

3,408,559

LINE VOLTAGE STABILIZER HAVING PARALLEL DYNAMIC AND STABLE IMPEDANCE PATHS

Natale J. Bambace, Greenwich, Conn., Charles R. Kenny, Purdy Station, N.Y., and Adolph G. Oesterle, Wyckoff, N.J., assignors to General Precision Systems Inc., a corporation of Delaware Filed Aug. 10, 1966, Ser. No. 571,483
8 Claims. (Cl. 323—22)

ABSTRACT OF THE DISCLOSURE

A resistive path and a transistor path variable over a continuous range are connected in parallel between a generator output and a load input. The voltage across the load is monitored and the transistor path is varied in accordance with the voltage sensed across the load. The components are substantially frequency insensitive.

The present invention relates to line voltage stabilization circuits. In particular, the present invention is a frequency insensitive output voltage stabilization circuit, adapted to be insensitive to a relatively wide range of frequencies, for example, a range exceeding that of 50 cycles per second to 400 cycles per second.

The novel line voltage stabilizer circuit couples an alternating current (AC) supply, hereinafter referred to as the output, to the input of an electrical appliance. The line voltage stabilizer circuit effectively monitors the output, by sensing the voltage across the load, and controls the impedance in the input line thereby providing a stable input voltage which is applied to the load, matching the input requirements of the load. The load may be any electrical apparatus or appliance which desires a reasonably constant or stable input. An example of such appliance is a television receiver or radio transmitter or receiver, or any number of different electrical appliances.

The coupling which connects the output to the input of the appliance includes an autotransformer, which lifts the output voltage to a level in excess of the input requirements of the load and a pair of parallel impedance paths, one of which consists of a stable impedance path, the other of which consists of a dynamic or variable impedance path. The dynamic impedance path is controlled by a voltage sensing device which senses the voltage across the load. The impedance in the line coupling is then varied according to the voltage across the load.

The sensing and control circuit includes dual generation means for generating a substantially stable reference voltage and a voltage which is proportional to the voltage across the load. The relationship between the reference voltage and the voltage proportional to the load serves as a basis for control of the voltage-dropping impedance across the input line.

It is an object of the invention to provide a line voltage stabilization circuit which is insensitive to frequency, over a wide range of frequencies.

Another object of the invention is to provide a line voltage stabilization circuit which stabilizes a 110 volt line or a 220 volt line by adjustment of certain components in the circuit.

Figure 2:
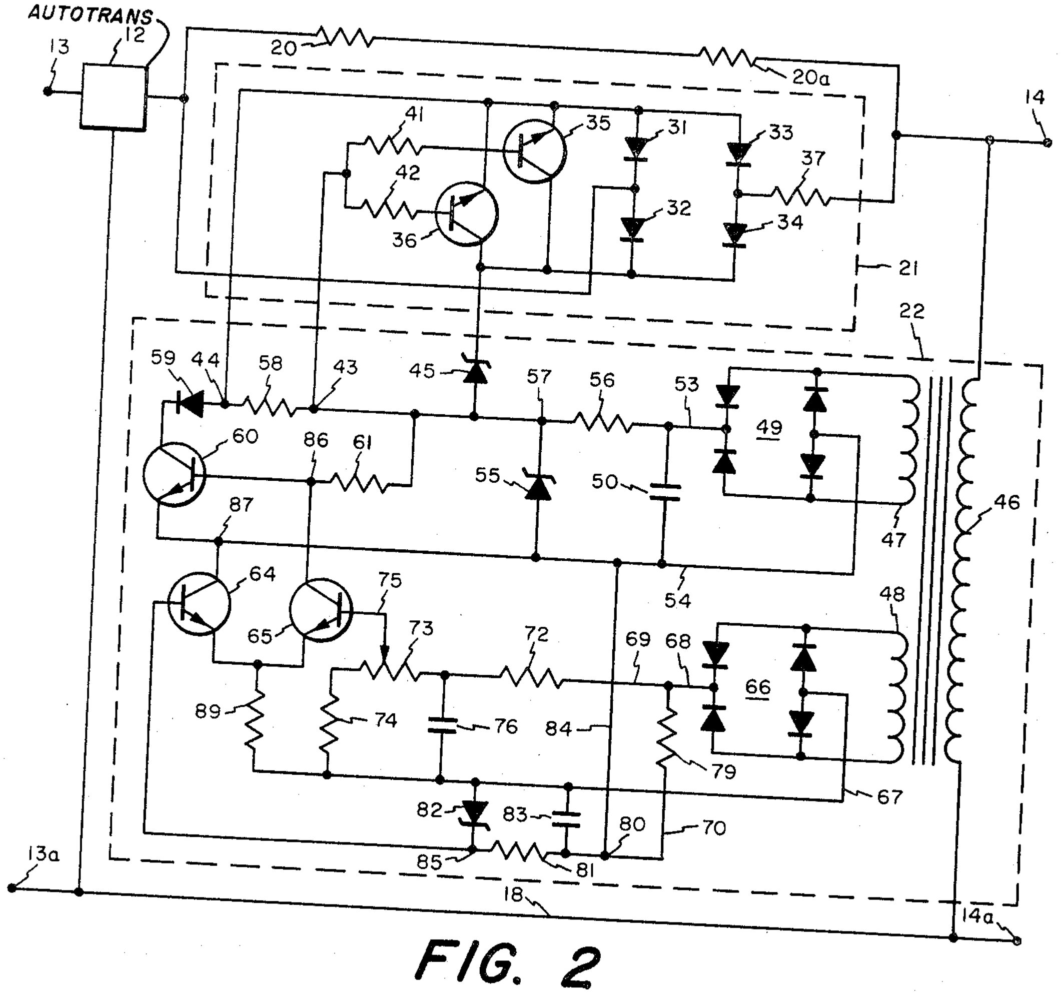
Figure 1:
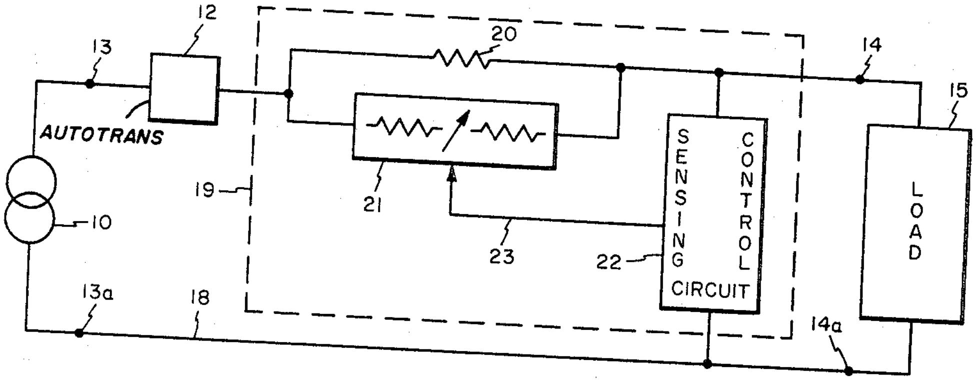

These and other objects will become obvious from reading the following description with reference to the accompanying drawings in which:

FIG. 1 is a block diagram of a system in which the present novel line voltage stabilization circuit controls the input voltage and FIG. 2 is a schematic circuit diagram of the line voltage stabilization circuit.

Referring in detail to FIG. 1, a generator 10 is represented as applying its output through the output terminals 13 and 13*a*. Terminal 13 connects to an autotransformer 12 and the autotransformer couples into the parallel impedance circuits of the line voltage stabilization circuit, included in broken line block 19. The output of the parallel impedance circuits, resistor 20 and block 21, is applied to the input terminal 14 of a load 15. Terminal 14*a* couples the load 15 to a return 18 which is coupled to the terminal 13*a* of the generator 10 output.

A sensing-control circuit, block 22, is connected across the load 15. Lead 23 represents that the variable impedance, block 21, is controlled by the sensing-control circuit, 22. The resistor 20 represents one parallel impedance circuit in which the impedance is stable. Block 21 represents the other parallel impedance circuit in which the impedance is variable or dynamic.

The generator 10 represents a power supply which may generate AC power having a voltage of, for example, 110 volts ±10% or 220 volts ±10%. For a generator having an output rated at 110 volts ±10% AC, the stable impedance 20 may include two 5 ohm resistors each rated at 50 watts. For a generator having an output rated at 220 volts ±% AC the stable impedance 20 may include two 5 ohm resistors and a 10 ohm resistor, each rated at 50 watts.

The frequency of the AC generated by the generator 10 may be substantially stable, and may be any frequency within a range of at least 50 cycles per second to 400 cycles per second or more. The AC may also vary in frequency throughout the same range, i.e., 50 to 400 cycles per second, at least.

In general terms the power supply represented may be the electric power normally supplied to the general public in any area substantially anywhere throughout the world.

For present purposes let it be assumed that the generator 10 is developing a power supply of some 110 volts ±10% at a frequency somewhere in the range of from 50 to 400 cycles per second.

FIG. 2 illustrates in a preferred form, the circuitry represented by broken line block 19 in FIG. 1.

The autotransformer (AT) 12 is a conventional component connected across the generator which lifts the voltage of the generator output so that the value of the voltage applied to the line voltage stabilization circuit is substantially greater in amplitude than may be required by the load, in the event the voltage of the supply drops below the normal amplitude. This insures that the minimum voltage applied to the line voltage stabilization circuit will be sufficient so that the voltage applied to the input 14 will match the requirements of the load when the voltage drop across the line voltage stabilization impedance circuit is at its lowest voltage drop value.

The stable impedance path includes resistors 20 and 20*a* and the dynamic impedance path includes a bridge circuit including diodes 31, 32, 33 and 34 and the collector to emitter circuits of transistors 35 and 36, in parallel. The diodes and transistors combine to provide two separate paths, thereby according passage of the AC supply. The value or amount of impedance in each path is a function of the intensity of conduction of the parallel power transistors. One dynamic impedance path includes diode 32, the parallel collector to emitter paths of transistors 35 and 36, diode 33 and resistor 37. The other dynamic impedance path includes resistor 37, diode 34, the parallel collector to emitter paths of the transistors 35 and 36 and diode 31.

Equality of intensity of conduction by each of transistors 35 and 36 is desired. Thus the base resistors 41 and 42 preferably substantially equalize the conduction characteristics of the transistors 35 and 36. Each base resistor is connected to a common potential, junction 43 and each emitter terminal is connected to another common potential, junction 44. Each collector terminal of the transistors 35 and 36 is held at a potential determined by the voltage drop required to produce the proper load voltage. In this respect the Zener diode 45 is connected between the collector of the power transistors 35 and 36 and the junction 43. When the voltage drop between the collector and emitter of transistors 35 and 36 reaches a value as determined by the breakdown potential of diode 45, further increase in voltage causes current to flow into the base resistors 41 and 42 causing transistors 35 and 36 to conduct more heavily, thereby limiting further increase in the collector to emitter voltage drop.

The voltage drop across the load, i.e., across terminals 14–14*a*, is sensed by a transformer coil 46. This is the primary coil of the voltage sensing transformer of the sensing-control circuit, block 22 in FIG. 1. Coils 47 and 48 are the secondary coils each of which step down the voltage proportionally, for rectification by the bridge rectifier circuits 49 and 66 respectively.

The bridge rectifier 49 rectifies the AC potential into a pulsating direct current (DC) potential and capacitor 50 coupled between the relatively positive lead 53 and the relatively negative lead 54 smooths out the pulsations. Zener diode 55 serves to regulate the voltage differential between junction 57 and lead 54. Resistor 56 serves as a current limiting resistor. The regulated DC is applied through resistor 58 and diode 59 to the collector terminal of transistor 60, the emitter of transistor 60 is coupled to the lead 54 via junction 87. Resistor 58 acts as a shunt path for the collector base leakage currents of transistors 35 and 36. A driving potential is applied to the base of transistor 60 via resistor 61 and junction 86.

The condition (or intensity) of conduction of the parallel power transistors 35 and 36 is controlled by the condition (or intensity) of conduction of transistor 60. This may be seen in that the difference in potentials at junctions 43 and 44 control the condition of conduction of the parallel transistors 35 and 36. The potential at junction 43 is applied through base resistors to the base of each transistor and the emitter of each of the transistors coupled to the return 54 through junction 44, diode 59 and the collector to emitter terminals of transistor 60.

The condition (or intensity) of conduction of transistor 60 is controlled by the condition of a differential amplifier which includes transistors 64 and 65, the collector of transistor 64 being coupled to the emitter of transistor 60 via junction 87, the collector of transistor 65 being coupled to the base of transistor 60 via junction 86, and the emitters of both transistors 64 and 65 connected to the return through a common resistance 89.

Bridge circuit 66 rectifies the AC voltage induced in coil 48, the lead 68 being positive with respect to the lead 67. Lead 68 separates into two paths one of which is regulated and the other unregulated. The unregulated current path includes lead 69, resistors 72, 73 and 74 and the return 67. A capacitor 76 is coupled between the return 67 and the junction of resistors 72 and 73, for filtering. Since the last described circuit path is unregulated, the voltage along the path rises and falls with the voltage sensed by the coil 46 across the load. Thus a voltage tapped off resistor 73, as by tap 75, will be proportional to the voltage across the coil 46. The proportional voltage, at tap 75, is applied to the base of transistor 65. The emitter terminal of transistor 65 is coupled to the return 67 via resistor 89. Thus, it will be seen that the condition (or intensity) of conduction of transistor 65 is related directly to the voltage drop across coil 46. This relationship may be initially adjusted, as desired by adjustment of tap 75.

The regulated current path from lead 68 includes resistor 79, junction 80, resistor 81 and Zener diode 82 connected to return 67. The base of transistor 64 is coupled to junction 85 thereby providing a regulated or stable voltage applied to the base of transistor 64. Capacitor 83 between junction 80 and lead 67 serves as a filter. The regulated voltage in the regulated path serves as a reference. The unregulated voltage is compared with the reference voltage by the differential amplifier. The emitter of transistor 64 is coupled to the return 67 via resistor 89. Thus the condition of the differential amplifier is reflected by the relation between the potentials at junctions 86 and 87, the base and emitter of transistor 60, respectively. When the potentials at tap 75 and at junction 85 are substantially equal the voltage across winding 46 is at the desired value. By adjusting the tap 75 to a different position on resistor 73 other desired potentials may be maintained across winding 46 (i.e., across the load).

From the circuit described, it will be apparent that when the output voltage of the generator increases the voltage across the load 15 will increase, rising above the input requirement. The voltage increases across the load will be sensed by the coil 46 which will result in greater induced voltage in the coils 47 and 48. The increase in voltage will appear in the unregulated current path and particularly at tap 75 where such voltage increase is effectively employed. The transistor 65 will be driven to conduct more heavily and, because of the nature of the differential amplifier, the transistor 64 will become less conductive. With transistor 64 less conductive transistor 60 becomes less conductive and the current supplied to control the variable impedance is reduced thereby reducing the intensity of conduction of transistors 35 and 36. With the transistors 35 and 36 reduced in intensity of conduction the impedance in that part of the line circuit formed by the transistors, is increased. This increases the voltage drop between terminals 13 and 14 thereby reducing the voltage applied across the load.

The circuit is self-compensating and operates to maintain the desired voltage applied across the load.

When the voltage output of the generator decreases, the voltage across the load will drop below the input requirement. The reduced voltage will be sensed by the coil 46 and appear as reduced voltage at tap 75. This causes the transistor 65 to conduct less heavily while transistor 64 conducts more heavily. This results in transistor 60 conducting more heavily therefore driving the power transistors 35 and 36 to conduct more heavily. With power transistor conducting more heavily the impedance in bridge-transistor circuit is reduced thereby reducing the voltage drop between terminals 13 and 14. This increases the voltage applied across the load and thus maintains the voltage level across the load at the requirement of the load.

The frequency insensitivity feature of the line voltage stabilization circuit is inherent in the circuitry herein described and is limited only by the design of the reactive components.

It is apparent that since the winding 46 senses the potential across the load any changes in current in the load which tend to effect the potential across winding 46 will be compensated for, in the manner described above.

The present invention has been described in its preferred form. Obviously rearrangement and/or substitution of parts may be made, as will be familiar to those skilled in the art, without departing from the spirit of the invention as defined in the appended claims.

What is claimed is:

1. In a line voltage stabilizing circuit having an input for receiving an alternating current, the voltage level of which is subject to variation and having an output coupled to the input of a load across which it is desired to maintain a substantially constant voltage level, the line voltage stabilizing circuit including, a stable impedance path coupled between the input of said stabilizing circuit and the output of said stabilizing circuit for providing a minimum voltage drop across said path, a dynamic continuously variable impedance path coupled in parallel with said stable impedance path for providing variable voltage drop across said path, said dynamic impedance path including, a first unidirectional current path for passing current only in one direction, a second unidirectional current path for passing current only in the opposite direction, said first and second current paths each including respective first and second variable impedance means for passing current in the direction of each path respectively, means for sensing the voltage across the said load, and control means for varying the impedance of said variable impedance means in accordance with the voltage sensed by said sensing means.

2. In a line voltage stabilizing circuit as in claim 1 and in which said first unidirectional current path includes, a first unidirectional component for passing current only in said one direction, said variable impedance means serially coupled to said first component and a second unidirectional component for passing current only in said one direction serially coupled to said variable impedance means, and said second unidirectional current path includes, a third unidirectional component for passing current only in said opposite direction, said variable impedance means serially coupled to said third component, and a fourth unidirectional component for passing current only in said opposite direction serially connected to said variable impedance means.

3. In a line voltage stabilizing circuit as in claim 2 and in which said variable impedance means includes, at least one transistor having a base, a collector and an emitter, and said first unidirectional component being coupled to said collector and said second unidirectional component being coupled to said emitter for completing said first unidirectional current path, and said third unidirectional component being coupled to said collector and said fourth unidirectional component being coupled to said emitter for completing said second unidirectional current path.

4. In a line voltage stabilizing circuit as in claim 3 and in which, said base of said transistor is coupled to said control means for controlling the condition of conduction in the collector-to-emitter circuit of said transistor for varying the impedance across said collector-to-emitter circuit.

5. In a line voltage stabilizing circuit having an input for receiving an alternating current, the voltage level of which is subject to variation, and having its output coupled to the input of a load across which it is desired to maintain a substantially constant voltage level, the line voltage stabilizing circuit including, an autotransformer coupled for receiving the alternating current and for increasing the level of the voltage at least a predetermined amount over the voltage level at the input, a stable impedance path coupled between said autotransformer and the output of said stabilizing circuit for providing a minimum voltage drop across said path, a dynamic continuously variable impedance path coupled in parallel with said stable impedance path for providing a variable voltage drop across said path, ranging from at least below said minimum voltage drop to substantially in excess of said minimum voltage drop, said dynamic impedance path including, a first unidirectional current path for passing current only in one direction, a second unidirectional current path for passing current only in the opposite direction, said first and second unidirectional current paths each including variable impedance means for passing current in the direction of each said path, respectively, and for varying the voltage drop across each said path respectively, means for sensing the voltage across said load and for providing a signal proportional to said voltage, and means for varying the voltage drop across said dynamic impedance path in accordance with the value of said signal.

6. In a line voltage stabilizing circuit as in claim 5 and in which said first unidirectional current path includes, a first unidirectional component for passing current only in said one direction, a second unidirectional component for passing current only in said one direction, and said variable impedance means being serially coupled between said first and second unidirectional components, and said second unidirectional current path includes, a third unidirectional component for passing current only in said opposite direction, a fourth unidirectional component for passing current only in said opposite direction, and said variable impedance means serially being coupled between said third and fourth unidirectional components.

7. In a line voltage stabilizing circuit as in claim 5 and in which said variable impedance means includes, at least one transistor having a base, an emitter and a collector, and the collector-to-emitter path of said transistor forming a part of said first unidirectional current path and said second unidirectional current path.

8. In a line voltage stabilizing circuit as in claim 7 and in which the collector-to-emitter path of the said transistor is the variable impedance means.

References Cited

UNITED STATES PATENTS

| | | | |
|---|---|---|---|
| 3,281,652 | 10/1966 | Perrins | 323—19 |
| 3,295,053 | 12/1966 | Perrins | 323—22 |
| 3,350,628 | 10/1967 | Gallaher et al. | 323—4 |
| 3,360,714 | 12/1967 | Borkovitz et al. | 323—43.5 |

JOHN F. COUCH, *Primary Examiner.*

A. D. PELLINEN, *Assistant Examiner.*